April 18, 1933.   C. S. BRAGG ET AL   1,904,266
BRAKE MECHANISM FOR AUTOMOTIVE VEHICLES
Filed Dec. 12, 1927   3 Sheets-Sheet 1
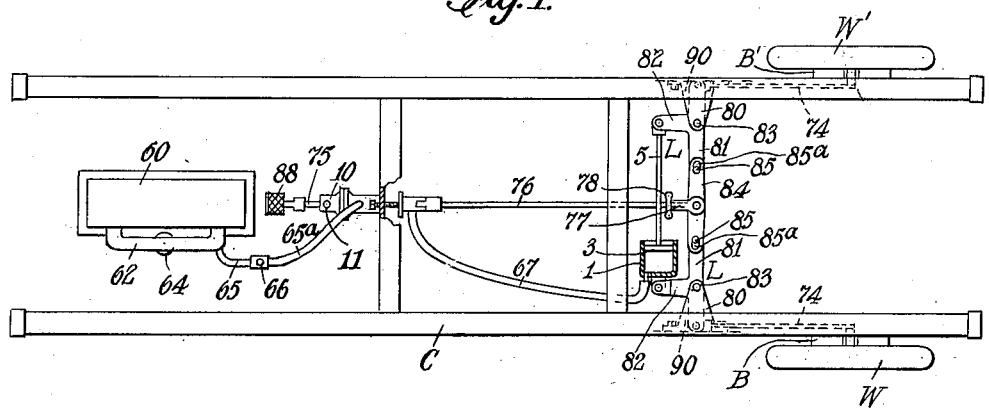
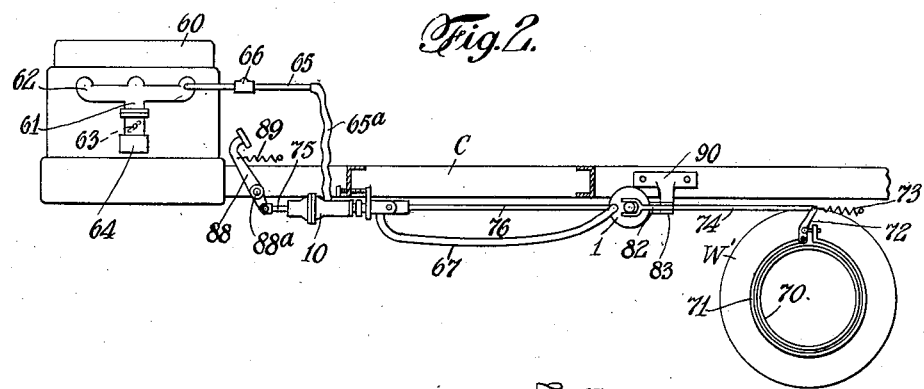
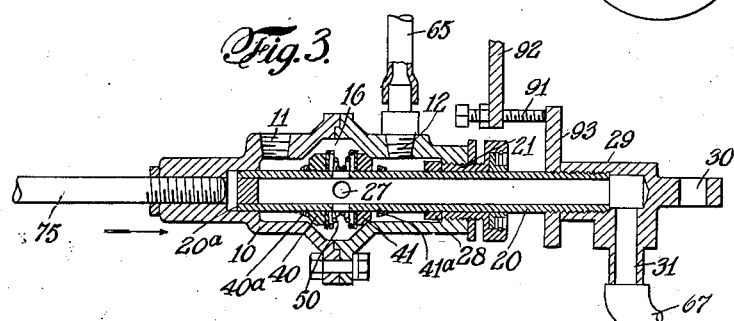

April 18, 1933. C. S. BRAGG ET AL 1,904,266
BRAKE MECHANISM FOR AUTOMOTIVE VEHICLES
Filed Dec. 12, 1927    3 Sheets-Sheet 2

Caleb S. Bragg
Victor W. Kliesrath
Inventors
By their Attorney
Louis Prevost Whitaker April 18, 1933.     C. S. BRAGG ET AL     1,904,266
BRAKE MECHANISM FOR AUTOMOTIVE VEHICLES
Filed Dec. 12, 1927     3 Sheets-Sheet 3
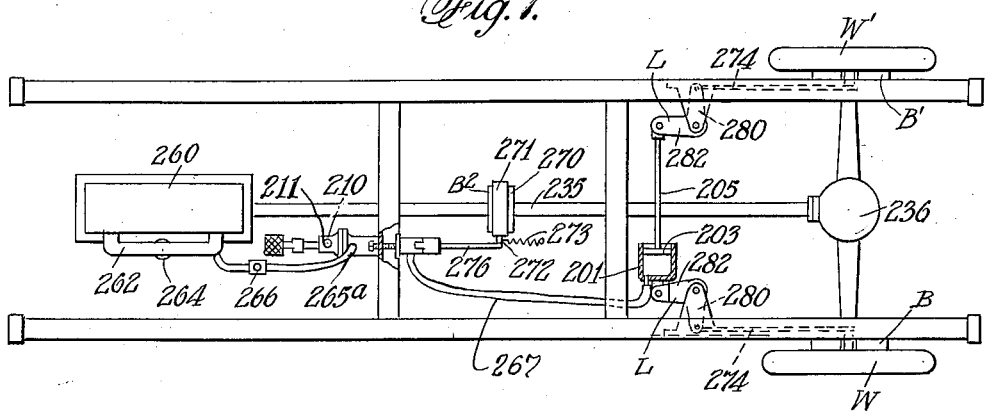
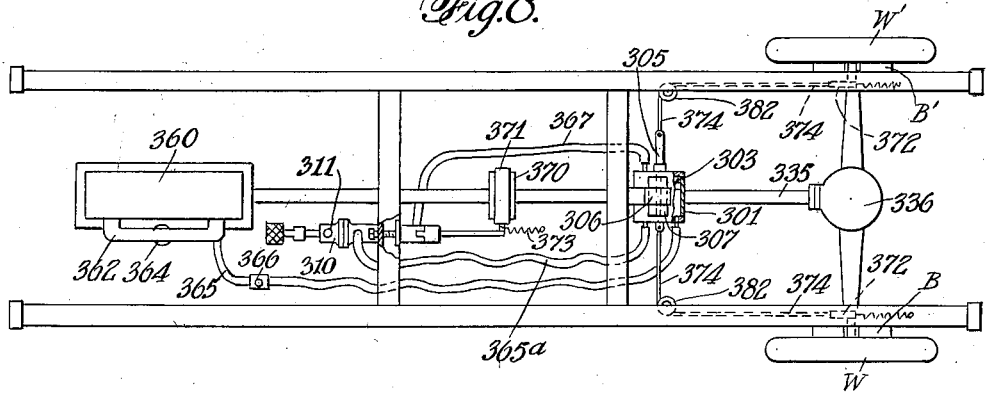

Patented Apr. 18, 1933

1,904,266

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE MECHANISM FOR AUTOMOTIVE VEHICLES

Application filed December 12, 1927. Serial No. 239,444.

Our invention consists in the novel features hereinafter described, reference being had to the accompanying drawings which show two embodiments of the invention selected by us for purposes of illustration, and the said invention is fully disclosed in the following description and claims.

The object of our invention is to provide a pair of brake mechanisms for a pair of wheels of an automotive vehicle located opposite to each other transversely of the vehicle with a power actuator comprising a cylinder and piston for operating them by power obtained by the differential of higher and lower fluid pressures, most conveniently atmospheric pressure operating against a partial vacuum or rarification obtained for example from the throttle controlled suction passage of an internal combustion engine which drives the vehicle (or other source of suction), the cylinder and the piston being both movable with respect to each other and with respect to the chassis of the vehicle, the piston being connected to one brake mechanism and the cylinder to the other so that the power of the actuator will always be applied equally to the brake mechanisms for both wheels without regard to the individual adjustments of the brake mechanisms or wear of brake linings, the stroke of the piston in the cylinder being sufficiently long to compensate for considerable wear of the brake linings and obviating frequent adjustments in the connections thereto, an operator operated part, which preferably controls the valve mechanism for the actuator, being connected with both brake mechanisms, so that the operator may apply his physical force equally thereto in addition to that of the power actuator, or to operate them independently of the actuator, in which case the valve mechanism is preferably first moved into position to vent the actuator cylinder and prevent compression therein, and a single adjusting means may be provided in the connection between the valve mechanism and the brake mechanism to prevent the operator operated part (usually the pedal lever) from striking a part or device which limits its movement as the brake linings wear, should the throw of the operator operated part be less than the stroke of the piston and cylinder. Our invention permits of the use of a smaller and cheaper power actuator for any given power required, and less air is therefore withdrawn into the suction source, with less danger of interfering with the operation of the engine or stalling it if idling where the suction is obtained from the suction passage of the engine; equalization in the application of force both of the actuator and of the operator is secured and only one adjustment need be made to compensate for the wear of the brake linings or shoes.

Referring to the accompanying drawings, Fig. 1 is a diagrammatic plan view of a portion of an automotive vehicle showing our invention embodied therein.

Fig. 2 is a diagrammatic elevation of the part shown in Fig. 1.

Fig. 3 is a detail sectional view of one form of controlling valve mechanism which may be employed for the actuator.

Fig. 7 is a diagrammatic plan view similar to Fig. 1, illustrating another modification of our invention.

Fig. 8 is a detail view showing another slight modification.

Figure 4:
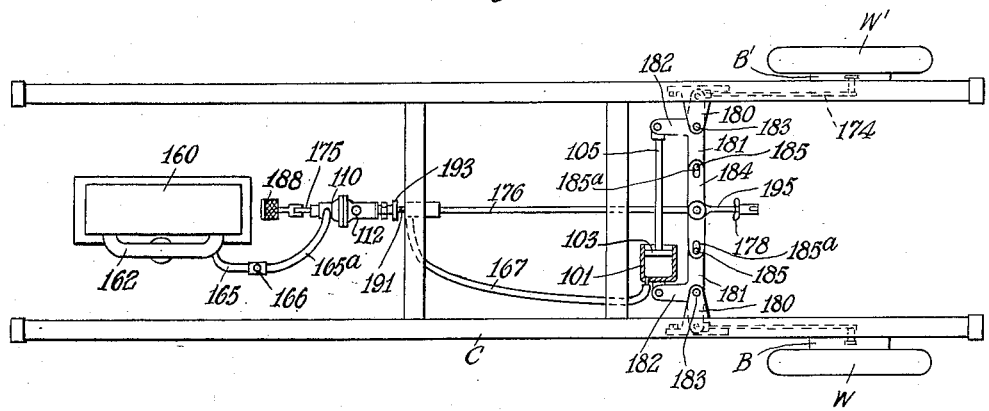
Figs. 4, 5 and 6 are views similar respectively to Figs. 1, 2 and 3, but illustrating a slight modification.

Figs. 1, 2 and 3 illustrate a very simple embodiment of our invention in which C represents the chassis of an automotive vehicle of which W, $W^1$, are a pair of oppositely disposed wheels, as the rear or driving wheels, driven in any usual or preferred manner by an internal combustion engine, 60, provided with the usual suction passage, 61, of which the intake manifold, 62, is a part, carburetor, 64, and throttle valve, 63, between the carburetor and the engine cylinders. B, $B^1$, represent the independent brake mechanisms for wheels, W, $W^1$, which may be of any desired type and are shown in this instance for example as comprising each a brake drum, 70, brake band, 71, and brake lever, 72, with its retracting spring, 73.

L, L, represent a pair of three armed levers, the arms of which are set at any desired angles to each other and united at the pivotal point, 83, thereof, said levers being pivoted to brackets, 90, secured to the chassis adjacent to opposite sides of the vehicle, each lever having in this instance an arm, 80, connected by a link, 74, with the adjacent brake lever, 72, a second arm, 81, extending transversely of the chassis on the other side of the point of pivoting, 83, of the lever, and a third arm, 82, substantially perpendicular to the arms, 80 and 81. Between the arms, 82, of the respective levers, L, L, we interpose a power actuator comprising a cylinder, 1, and a piston, 3, each of which is connected to one of said arms, 82. In this instance the cylinder, 1, is shown pivotally connected to and supported by one arm, 82, the piston being provided with a piston rod, 5, pivotally connected to the other arm, 82. The arms, 81, extend toward each other and are pivotally connected to opposite ends of a connecting link, 84, the pivot pins, 85, engaging slotted apertures, 85ª. It will be understood that both the cylinder and the piston are movable with the respective arms, 82, to which they are connected.

The actuator is provided with suitable controlling valve mechanism, and in this instance we have shown a form of valve mechanism covered by our former Letters Patent of the United States No. 1,731,041 patented October 8th, 1929. Briefly this valve mechanism comprises a valve casing, 10, provided with a central valve chamber, 16, in which are located two oppositely disposed valves, 40 and 41, the casing being provided with apertures, 11 and 12, on opposite sides of the chamber, and the chamber being connected with the closed end of the cylinder through a hollow valve actuating sleeve, 20, movable with and with respect to the valve casing and valves, and having an aperture, 27, communicating with the chamber, 16, between the valves, and a fitting, 29, outside of the casing having an ear, 30, and a connection, 31, to which a flexible tubular connection with the cylinder can be connected. The valves are normally pressed toward their seats at opposite ends of chamber, 16, by yielding means, 50, and sealingly engage the sleeve, 20, which is provided with collars, 40ª and 41ª, so located as to effect the opening of one valve after permitting the other to close, by a movement of the valve sleeve in either direction with respect to the valve casing, and permitting both valves to be closed at the same time. The lost motion between the sleeve, 20, and the valve casing is limited, in one direction by a collar, 28, on the sleeve which engages the adjusting sleeve, 21, in the end of the casing, and in the other direction by the engagement of the end, 20ª, of the sleeve with the valve casing.

In this instance we have shown an operator operated part consisting of a pedal lever, 88, pivoted at 88ª, to the chassis, and provided with a retracting spring, 89, said lever being connected below its pivot by a link, 75, to the valve casing, 10, the valve actuating sleeve, 20, being connected by a link, 76, to the center of the link, 84, a turn buckle, 77, of well known construction, provided with a threaded adjusting wing nut, 78, (or other adjustable means) being interposed between the link, 76, and the link, 84, to vary the effective length of the link, 76. We also provide an adjustable stop, 91, consisting in this instance of a set screw in a bracket, 92, secured to the chassis, for engaging a collar, 93, on the valve actuating sleeve, 20, to determine the position of the brakes and valve mechanism in the released position.

In the installation illustrated in Figs. 1 and 2, the aperture, 12, of the valve casing is connected with a source of suction, being connected in this instance by a suction pipe, 65, a portion, 65ª, of which is flexible, with the suction passage of the engine between the throttle valve and the engine cylinders, the connection being made conveniently with the intake manifold, 62, and the suction pipe is provided with a check valve, 66, opening in a direction toward the manifold. The aperture, 11, of the valve casing is in communication with a source of higher fluid pressure, which in this instance is the atmosphere. In the released position of the valve mechanism which is illustrated in Fig. 3, the valve, 40, which is the higher pressure valve, is held in open position by the retracting spring, 89, of the foot lever, the collar, 28, being in engagement with the adjusting sleeve, 21, and valve sleeve in engagement with the stop, 91. The valve actuating sleeve, 20, is connected by a pipe, 67, also flexible, with the closed end of the cylinder, and the valve, 40, being in open position, the cylinder is in communication with the atmosphere. Both faces of the piston and the opposite faces of the closed end of the cylinder are subjected to atmospheric pressure, and the pressures in the actuator are equalized. To effect an application of the brake mechanism by power, the operator will depress the foot lever, thereby moving the valve casing, 10, rearwardly in the direction of the arrow in Fig. 3, with respect to the valve actuating sleeve, closing the air inlet valve, 40, and thereafter opening the suction valve, 41, so as to connect the cylinder with the suction pipe, 65, leading to the intake manifold. Assuming that the engine is running and the throttle valve is closed or partly closed, the air will be exhausted from the cylinder, 1, and the atmospheric pressure on the outer face of the piston and the cylinder head will effect the movement of the cylinder and piston toward each other, thereby applying the brake mechanisms, B, B¹, simultaneously, and equalizing the amount of pressure exerted by said power actuator regardless of the adjustment of the brake bands or the wear of the braking surfaces. The stroke of the piston in the cylinder is made sufficiently long to insure the application of both brake mechanisms to their maximum extent by power, regardless of the wear of the braking surfaces, without bringing the piston into contact with the head of the cylinder and therefore it will be unnecessary to adjust the brake mechanisms or to give them any special attention, except to replace the brake linings when sufficiently worn to require replacement. As the brakes are applied by power, the arms, 81, of the three armed levers, L, L, will be moved rearwardly, causing a rearward movement of the link, 84, the link, 76, the valve mechanism and the lower end of the pedal lever, 88, the upper end of the pedal lever moving in a forward direction with the foot of the operator and following up the application of the brakes by the power actuator without necessarily applying the physical force of the operator to the brake mechanisms. When the brakes have been fully applied by the power actuator, the operator may, however, apply his physical force to the pedal lever and thereby to the equalizing link, 84, which will transmit his physical force equally to the arms, 81, of the levers, L, L, and through the arms, 80, thereof to the brake mechanisms, thus permitting the operator to apply his physical force in addition to that exerted by the actuator, whenever desired, and to distribute it equally to the brake mechanisms, B, B¹, as in making emergency stops and in applying the brakes when the vehicle is unusually heavily loaded, for example. It will also be seen that should power fail for any reason, the operator can depress the foot pedal, so as to take up the lost motion between the valve casing and the valve actuating sleeve, 20, which will shift the valve mechanism in position to vent the cylinder and prevent the accumulation of pressure therein by the relative movements of the piston and cylinder, and can apply his physical force directly to both brake mechanisms through the equalizing link, 84, and the respective three armed lever, L, L.

The only adjustment which need be made at any time in brake mechanism embodying our present invention is that provided by the turn buckle, 78, or its equivalent, by which the effective length of the link, 76, between the valve mechanism, which is provided with a stop, 91, which determines the off position of the brakes, and the equalizing link, 84, may be varied when necessary, to prevent the foot lever from reaching its limit of movement, which is usually determined by the pedal coming in contact with the floor board, before the brakes are fully applied, to the maximum extent by the physical force of the operator.

According to our invention in which the cylinder and piston are both movable and are each connected with one of the brake mechanisms to be operated, a smaller, cheaper and lighter power actuator can be employed for a given power, and consequently less air will have to be withdrawn from the actuator and discharged into the intake manifold to effect the operation of the brake mechanisms, thus tending to prevent interference with the operation of the internal combustion engine, or the possibility of stalling it if idling, which would put an end to the suction on which the operation of the brake mechanisms depends. Our invention also provides an equalization of the power applied to both brake mechanisms and through them to the wheels when actuated by power or by the physical force of the operator, or both, thus obviating the necessity for individually adjusting said brake mechanisms to secure an equal application thereof, and by making the cylinder of sufficient length to provide for the maximum application of the brakes, regardless of the wear of the braking surfaces. The adjustment of the brake mechanisms will ordinarily be unnecessary, and only the replacement of worn brake linings or shoes will be required. Only one adjustment is necessary to compensate for the normal wear of the brake linings, to wit, the wing nut, 78, of the turn buckle, 77, or equivalent device, which may be provided for the operator operated pedal or lever when the movement of same is limited, and will not permit the full power stroke of the piston and cylinder.

Figure 5:
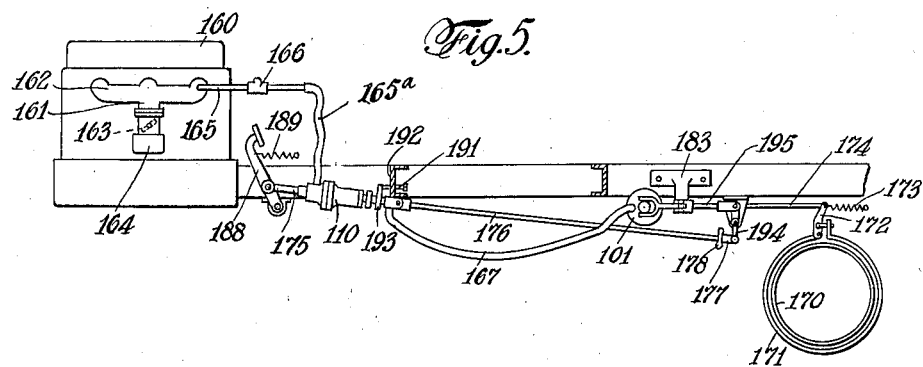
Figure 6:
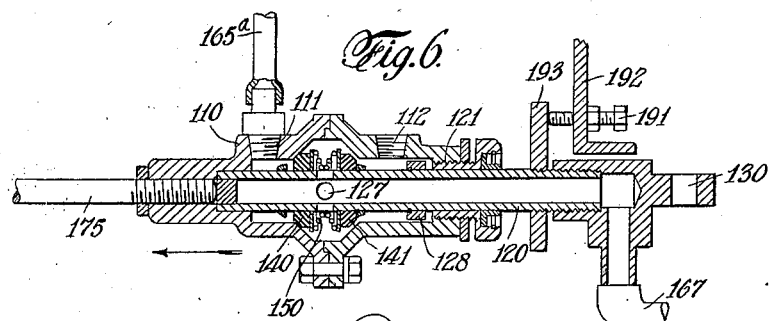

In Figs. 4, 5 and 6 we have shown a slightly modified construction in which the connection between the brake mechanism and the foot lever is made above the point of pivoting of the latter, instead of below the point of pivoting, as in Figs. 1, 2 and 3. In these figures the parts corresponding with those shown in Figs. 1, 2 and 3 and previously described have been given the same reference numerals with the addition of 100 to avoid unnecessary repetition. In this construction the link, 175, from the valve casing, 110, to the pedal lever, 188, is connected to the lever above its point of pivoting, so that the depression of the pedal exerts a pull on the valve casing in the direction of the arrow in Fig. 6, instead of a rearward push as in the construction shown in Figs. 1, 2 and 3. This necessitates the connection of the suction pipe, 165, with the aperture, 111, of the valve casing, the aperture, 112, being open to the atmosphere, and arrangement of the adjustable stop, 191, supported by the bracket, 192, secured to the chassis in such position that it will engage the rear face of the collar, 193, on the valve actuating sleeve, 120, so as to limit its rearward movement as shown in Fig. 5. In the normal or released position of the valve mechanism which is indicated in Fig. 6, the valve, 140, which becomes the suction valve will be maintained in closed position, while the valve, 141, which becomes the higher pressure inlet valve will be maintained in open position and connect the cylinder, 101, of the actuator with the atmosphere (or other source of higher pressure) through the hollow valve actuating sleeve, 120, and the flexible pipe, 167. The valve actuating sleeve, 120, is connected by the link, 176, with the equalizing link, 184, through a lever, 194, pivoted centrally to the chassis and having one end connected with the link, 176, by means of the adjusting device, or turn buckle, 177, having a revoluble wing nut, 178, the other end of the lever, 194, being connected by a link, 195, with the center of the equalizing link, 184, as shown in Figs. 4 and 5, so that a forward movement of the link, 176, will produce a rearward movement of the equalizing link, 184. The other parts of the apparatus illustrated in Figs. 4, 5 and 6 are constructed as hereinbefore described, and the operation of the mechanism is exactly the same with the exception that the draft on the link, 175, connected with the valve casing and on the link, 176, (when the operator applies his physical force through it to the brake mechanism by taking up the lost motion between the valve actuating sleeve, 120, and the valve casing) will be in a forward direction, and the lost motion referred to will be limited in this instance by the arrangement of the collar, 128, on the valve actuating sleeve with the adjustable collar, 121, in the rear end of the valve casing.

Our invention is also applicable to a brake system for automotive vehicles in which the operator operated part is connected, by means providing lost motion, with brake mechanism other than the brake mechanisms with which the power actuator is connected. For example, we have illustrated in Fig. 7 diagrammatically such a construction, the parts corresponding with those previously described and illustrated in Figs. 1, 2 and 3 being given the same reference characters with the addition of 200. In this construction the rear or non-steering wheels of the vehicle, indicated at W, W¹, are shown as driven by the propeller shaft, 235, through the usual differential gearing, the housing for which is indicated at 236, the propeller shaft being provided with a brake mechanism indicated at B², and comprising in this instance the usual brake drum, 270, brake band, 271, and brake applying lever, 272, and retracting spring, 273, of usual or well known construction, the brake mechanism for the propeller shaft may, however, be of any desired type. Obviously this propeller shaft brake mechanism will apply braking force to both of the rear wheels through the differential gearing in a well known manner, and the differential gearing also acts as an equalizing device to distribute the braking force of the propeller shaft brake mechanism between the rear wheels.

In this instance the rear wheels are also provided with the independent brake mechanisms, B, B¹, as previously described, which are connected by the links, 274, to the outwardly extending arms, 280, of the levers, L, L, which in this instance have only two arms, the forwardly extending arms, 282, being operatively connected with the cylinder and piston respectively of the power actuator in the manner previously described. In this instance the link rod, 276, from the valve actuating part of the controlling valve mechanism for the actuator, instead of being connected with the brake mechanisms, B, B¹, operated by the actuator, is connected, as shown, to the lever, 272, of the propeller shaft brake mechanism. The operation of the brake system shown in Fig. 7 will be exactly the same as that previously described except that when the lost motion provided in the connections between the operator operated part and the propeller shaft brake mechanism, B², is taken up, the physical force of the operator may be used to supply braking forces for the rear wheels, W, W¹, through the propeller shaft brake mechanism, in addition to the power exerted by the power actuator on the independently operable brake mechanisms, B, B¹, for said wheels, W, W¹, and in case of failure of power the physical force of the operator may be used to supply braking forces for the rear wheels, W, W¹, by operating the propeller shaft brake mechanism, B², without operating the brake mechanisms connected with the power actuator.

It will be understood that our invention is also applicable to installations in which the power actuator piston is exposed on both faces to the lower pressure fluid, such as is illustrated for example in Figs. 1 and 2 of our former Letters Patent of the United States, No. 1,731,041, hereinbefore referred to, and it will be also understood that the cylinder may be movably supported from and with respect to the chassis, and the cylinder and piston connected by cables passing around sheaves of pulleys mounted on the chassis instead of operating through levers as previously described. In Fig. 8 we have shown a diagrammatic view similar to Fig. 7, in which the parts corresponding to those shown in Figs. 1, 2 and 3 are given the same numerals with the addition of 300, and which illustrate the foregoing modifications. In this instance the actuator cylinder, indicated at 301, is closed at both ends, the outer closed end of the cylinder forward of the piston being connected at all times with the suction passage of the engine by a suction pipe, 365, which extends directly to the suction passage. The valve mechanism will occupy the position shown in Fig. 6, when in released position, the aperture forward of the valve chamber being connected with the atmosphere, the aperture in rear of the valve chamber being connected by a pipe, 365ª, with the cylinder forward of the piston, while the hollow valve actuating sleeve is connected by the pipe, 367, with the cylinder in rear of the piston, thereby connecting the ends of the cylinder on opposite sides of the piston with each other and with the suction passage of the engine when the valve is in the released position shown in Fig. 6.

The cylinder, 301, and the piston therein are supported in this instance from the chassis of the vehicle by means permitting the cylinder and piston to move with respect to the chassis and with respect to each other. In this instance we have shown the chassis provided with a grooved guide, indicated at 306, to receive a slide bracket, 307, secured to the cylinder, 301, of the actuator. The rear or non-steering wheels, W, W¹, are shown as provided with the brake mechanisms, B, B¹, constructed as hereinbefore described, the operating levers, 372, of said brake mechanisms being connected in this instance by cables, 374, 374, passing around sheaves, 382, mounted on the chassis with the cylinder, 301, and with the piston rod, 305, of the piston, 303, respectively. In this instance for convenience of illustration, the link, 376, from the valve acuating sleeve is connected to the operating arm, 372, of propeller shaft brake mechanism, B², as in Fig. 7. The operation of the construction illustrated in Fig. 8 will be the same as that previously described with reference to Fig. 7, so far as the application of the brakes is concerned, but it will be understood that as the portion of the cylinder forward of the piston is at all times connected with the suction passage of the engine, the piston will be exposed on both faces to suction, or in other words the lower fluid pressure, when in released or off position. In order to accomplish this result the suction pipe, 365a, is connected to the valve casing adjacent to the open valve, 141 (Fig. 6) so as to connect the pipe, 367, leading to the cylinder on the opposite side of the piston, with suction in the released position. The forward movement of the pedal to apply the brake mechanisms, B, B¹, by power, will disconnect the two ends of the cylinder from each other and admit the higher pressure fluid or atmospheric air to the cylinder in rear of the piston, effecting a power stroke of the piston and cylinder which move toward each other, without admitting any appreciable quantity of air to the suction passage of the engine, while on the release of the pedal the valve mechanism will reconnect the portions of the cylinder on opposite faces of the piston with each other and with the suction passage of the engine, to effect an equalization of pressures within the cylinder and to withdraw the air previously admitted, and permit the brakes to relieve themselves and be returned to their released position with the piston and cylinder under the action of the retracting means for the brake mechanisms, B, B¹. The physical force of the operator may also be applied to the wheels, W, W¹, as before described, in this instance through the propeller brake mechanism as described with reference to Fig. 7.

The construction illustrated in Figs. 7 and 8 is not specifically claimed herein as it forms the subject matter of a divisional application filed by us April 16th, 1929, Serial No. 355,618.

What we claim and desire to secure by Letters Patent is:—

1. In a brake system for automotive vehicles provided with an internal combustion engine having a throttle controlled suction passage from the carburetor to the engine cylinders, the combination with separate brake mechanisms for a pair of wheels mounted on one of the axles of the vehicle, of a power actuator comprising a cylinder and piston both movable with respect to each other, connections from the cylinder to one of said brake mechanisms, connections from the piston to the other of said brake mechanisms, controlling valve mechanism for said actuator, means for connecting a closed end of the cylinder on one side of the piston with said suction passage between the throttled valve and the engine cylinders and with a source of higher fluid pressure, under the control of said valve mechanism, an operator operated part having limited movement connected with said valve mechanism, a power equalizing and distributing device connected with said brake mechanisms and with said valve mechanism, said operator operated part being connected with said equalizing device by means providing sufficient lost motion to insure the operation of said valve mechanism, said actuator piston having a power stroke of sufficient length to compensate for the wear of the braking surfaces, and an adjusting device in the connections between the operator operated part and said power equalizing and distributing device, whereby the power of the actuator or of the operator, or both, may be simultaneously and equally applied to the brake mechanisms regardless of the wear of the braking surfaces, and the adjustment of said adjusting device will compensate for all wear of braking surfaces of the brake mechanisms, to maintain the parts in operative positions.

2. In a brake system for automotive vehicles provided with an internal combustion engine having a throttle controlled suction passage from the carburetor to the engine cylinders, the combination with separate brake mechanisms for a pair of wheels mounted on one of the axles of the vehicle, a pair of pivoted levers each provided with three arms, one arm of each lever being connected with one of said brake mechanisms, a power actuator comprising a cylinder operatively connected with another arm of one of said levers, and a piston operatively connected with the corresponding arm of the other of said levers, controlling valve mechanism for the actuator, means for connecting a closed end of the cylinder on one side of the piston with the suction passage of the engine between the throttle valve and the engine cylinder and with the source of higher fluid pressure under the control of said valve mechanism, an operator operated part connected with said valve mechanism, said levers being each provided with an equalizing arm, an equalizing link pivotally connected at its opposite ends with said equalizing arms and having its central portion connected with the operator operated part by means providing sufficient lost motion to insure the operation of the valve mechanism, and an adjusting device in the connections between the operator operated part and said equalizing link.

3. In a brake system for automotive vehicles, the combination with brake mechanisms for a pair of wheels disposed oppositely to each other transversely of the vehicle, of a power actuator comprising a cylinder and piston, both movable with respect to each other and with respect to the vehicle, connections from the cylinder to brake mechanism for one of said wheels, connections from the piston to brake mechanism for the other of said wheels, controlling valve mechanism for the actuator, provided with relatively movable parts having a limited movement with respect to each other, means for establishing differential fluid pressures on opposite faces of said piston and said cylinder under the control of said valve mechanism, an operator operated part, connected with one of said relatively movable valve parts, and connections from the other of said relatively movable valve parts to both of said brake mechanisms.

4. In a brake system for automotive vehicles, the combination with brake mechanisms for a pair of wheels disposed oppositely to each other transversely of the vehicle, of a power actuator comprising a cylinder and piston, both movable with respect to each other and with respect to the vehicle, connections from the cylinder to brake mechanism for one of said wheels, connections from the piston to brake mechanism for the other of said wheels, controlling valve mechanism for the actuator, provided with relatively movable parts having a limited movement with respect to each other, means for establishing differential fluid pressures on opposite faces of said piston and said cylinder under the control of said valve mechanism, an operator operated part, connected with one of said relatively movable valve parts, and connections from the other of said relatively movable valve parts to both of said brake mechanisms, and a single adjusting device in the connections between the operator operated part and said brake mechanisms.

5. In a brake system for automotive vehicles, the combination with brake mechanisms for a pair of wheels disposed oppositely to each other transversely of the vehicle, of a power actuator comprising a cylinder and piston, both movable with respect to each other and with respect to the vehicle, connections from the cylinder to brake mechanism for one of said wheels, connections from the piston to brake mechanism for the other of said wheels, controlling valve mechanism for the actuator, provided with relatively movable parts having a limited movement with respect to each other, means for establishing differential fluid pressures on opposite faces of said piston and said cylinder under the control of said valve mechanism, an operator operated part, connected with one of said relatively movable valve parts, connections from the other of said relatively movable valve part to said brake mechanisms, including equalizing means, and a single adjusting device in said last mentioned connections interposed between said equalizing means and the valve part connected therewith.

6. In a brake system for automotive vehicles, the combination with separate brake mechanisms for a pair of wheels mounted on one of the axles of the vehicle, of a power actuator comprising a cylinder and piston both movable with respect to the vehicle, a pair of pivoted multiple arm levers, each having one arm operatively connected with one brake mechanism, said cylinders being pivotally connected and supported by another arm of one of said levers, and the piston being operatively connected with a corresponding arm of the other of said levers, an equalizing link operatively connected with the third arm of each of said levers, a valve mechanism for the actuator, means for connecting a closed end of said cylinder on one side of the piston with sources of higher and lower fluid pressures under the control of said valve mechanism, and an operator operated part connected with said valve mechanism, and connected with the said equalizing link by means providing initial lost motion sufficient to insure the operation of the valve mechanism.

7. In a brake system for automotive vehicles, the combination with separate brake mechanisms for a pair of wheels mounted on one of the axles of the vehicles, of a power actuator comprising a cylinder and piston both movable with respect to the vehicle, a pair of pivoted multiple arm levers, each having one arm operatively connected with one brake mechanism, said cylinder being pivotally connected and supported by another arm of one of said levers and the piston being operatively connected with a corresponding arm on the other of said levers, an equalizing link operatively connected with the third arm of each of said levers, a valve mechanism for the actuator, means for connecting a closed end of said cylinder on one side of the piston with sources of higher and lower fluid pressures under the control of said valve mechanism, and an operator operated part connected with said valve mechanism having limited movement, and connected with the said equalizing device by means providing initial lost motion sufficient to insure the operation of the valve mechanism, the piston having a sufficient stroke in said actuator cylinder to compensate for wear of the braking surfaces, and an adjusting device in the connections between the operator operated part and said equalizing link to compensate for the wear of the braking surfaces with respect to said limited movement of said operator operated part.

In testimony whereof we affix our signatures.

CALEB S. BRAGG.
VICTOR W. KLIESRATH.